June 5, 1956
H. Z. BENTON
2,748,863
PERFORATING MACHINE FOR THERMOPLASTIC FILMS
Filed March 2, 1953
2 Sheets-Sheet 1
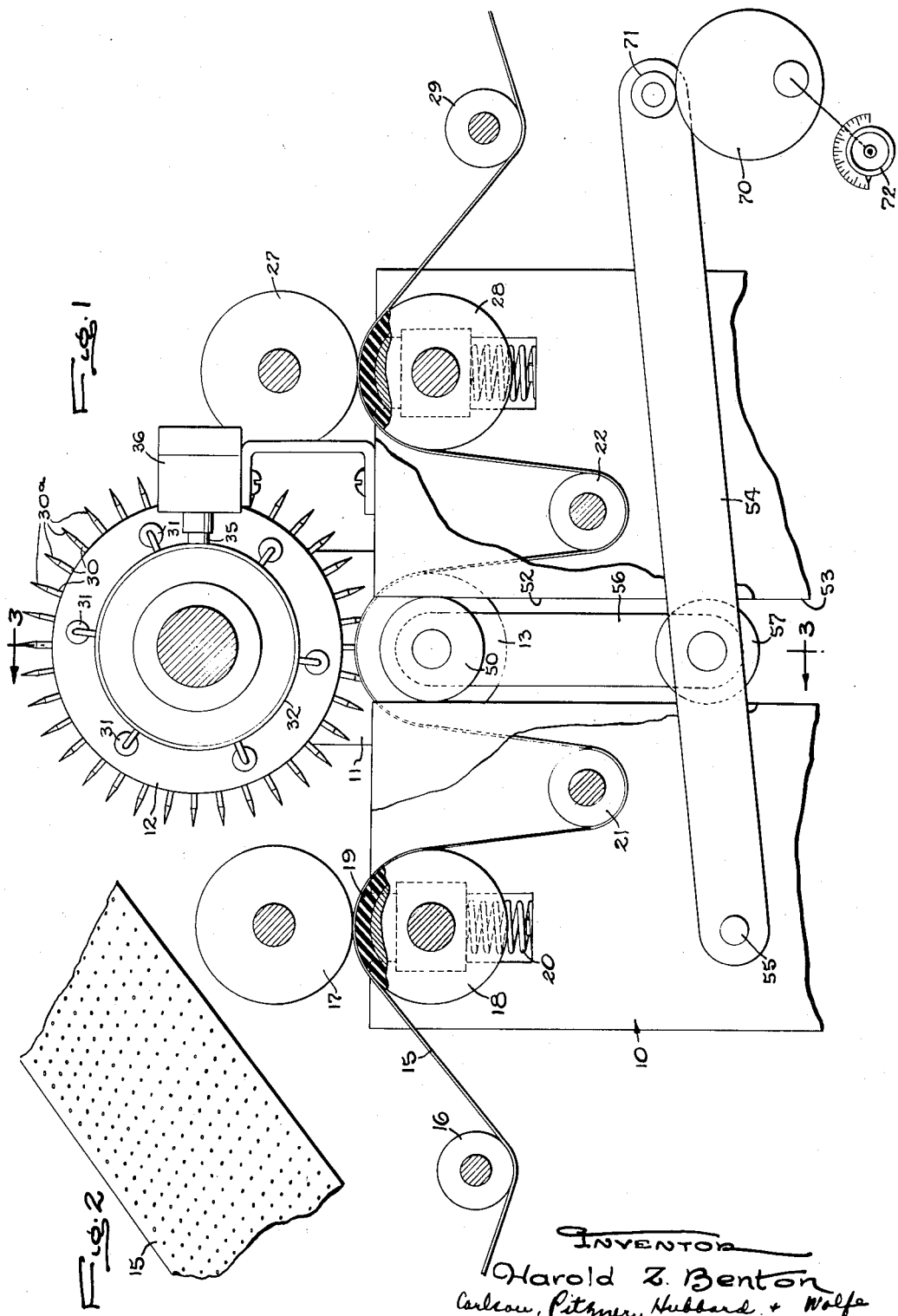
INVENTOR
Harold Z. Benton
Carlson, Pitzner, Hubbard + Wolfe
ATTORNEYS

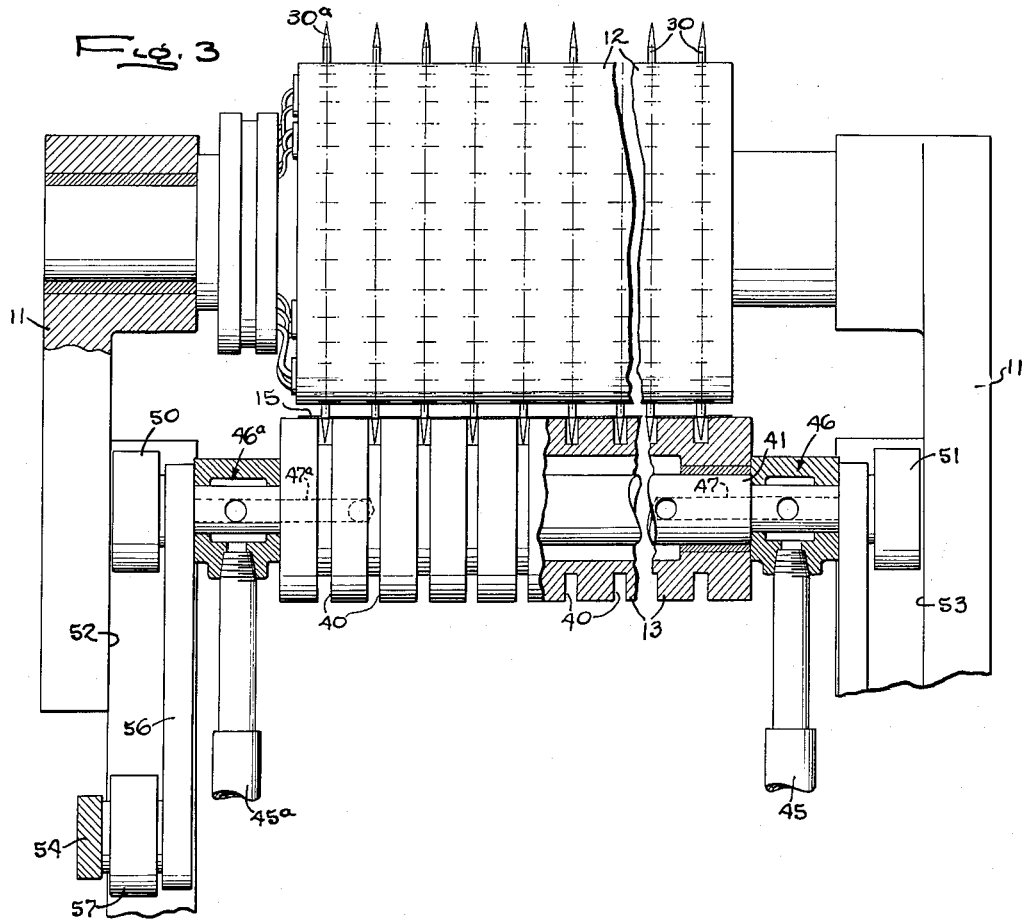
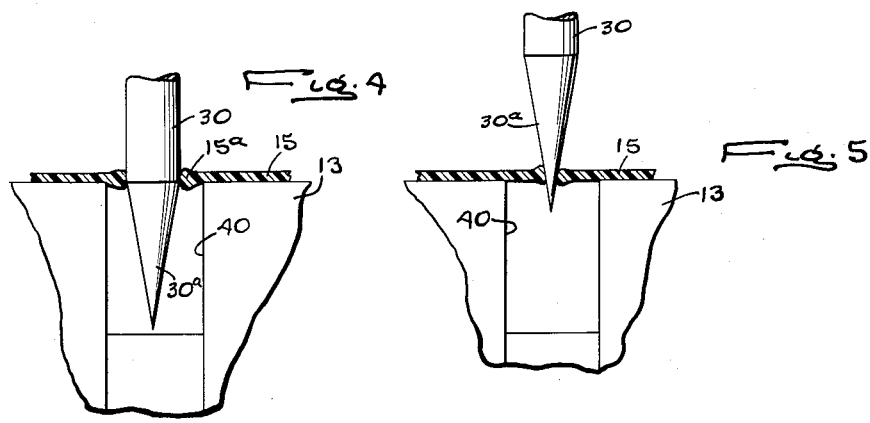

United States Patent Office 2,748,863
Patented June 5, 1956

2,748,863
PERFORATING MACHINE FOR THERMOPLASTIC FILMS

Harold Z. Benton, Woodstock, Ill.

Application March 2, 1953, Serial No. 339,838

2 Claims. (Cl. 164—99)

The present invention relates to a machine for perforating thermoplastic sheet material.

The use of films of thermoplastic material, for example, the various vinyl and polyethylene compounds to provide a non-porous barrier and for electrical insulation, is well known. The use of such films for "perforated" barriers and containers has been restricted, however, because of the difficulty of producing perforations of the desired size which will remain open under all conditions of use and which will not distort or cause a substantial weakening of the film. A number of uses for perforated plastic film material are particularly exacting. Among these may be mentioned use in primary and secondary batteries as plate separators, the hole size having a critical effect on the electrical characteristics, and use for produce bags where a predetermined opening must be maintained for air circulation. The latter is particularly necessary for fruits and vegetables to permit natural ripening while preventing excessive moisture loss. These and other applications require low cost perforated films which are dimensionally stable and which resist tearing and abrasion.

Accordingly, it is an object of the present invention to provide a novel arrangement for producing efficient perforation of a thermoplastic film with holes of uniform size and spacing. It is another object of the present invention to provide a device for perforating films of thermoplastic material in which the hole size may be precisely controlled over a wide range of diameter and in which adjustment may be effected easily and quickly. It is also an object to provide a novel device for perforation of plastic films wherein the individual holes are smoothly and symmetrically reinforced about their periphery so as to remain fully open under all normal conditions of use, with the original dimension accurately maintained and without sacrificing any of the strength and wear resistance of the film. It is a further and related object to provide a novel perforating device for thermoplastic films in which "punchings" and the attendant disposal problems are eliminated and which at the same time prevents the gumming and clogging normally associated with thermal perforation.

It is an object of the invention to provide a perforating machine which is capable of perforating two or more films simultaneously but in which the thermal conditions are so controlled as to prevent the films from sticking together.

It is a more detailed object of the invention to provide a perforating machine which is capable of perforating thermoplastic sheet material at high speed, which is inexpensive to construct and maintain, and which is adaptable for use with thermoplastic sheet material having a wide range of thickness and a wide variation in softening point and other physical characteristics.

Other objects and advantages of the invention will become apparent upon a reading of the attached specification and upon inspection of the drawings, in which:

Figure 1 is a view in elevation of a perforating machine constructed in accordance with the present invention in partial section and with certain of the elements shown diagrammatically in order to facilitate understanding.

Fig. 2 shows a perforated film produced by the machine of Fig. 1.

Fig. 3 is a transverse section taken along the line 3—3 of Fig. 1.

Fig. 4 is a fragmentary view showing the perforation of a hole of maximum size.

Fig. 5 is a fragmentary view showing the perforation of a hole of limited size using the same pins as in Fig. 4.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring now to the drawings and particularly Figs. 1 and 3, it will be seen that the perforating machine includes a frame 10 having a number of cylindrical rollers journaled therein. Mounted in the frame on brackets 11 is a perforating cylinder 12 which cooperates with an anvil roller 13. The construction and operation of the perforating cylinder and anvil roller will be described in detail at a later point, and it will suffice to say that the thermoplastic film, indicated at 15, passes between them to produce an evenly spaced series of perforations over the entire area of the film as shown in Fig. 2.

The film 15 is received from a parent roll not shown. It passes first around an idler roller 16. From the idler roller the film passes between nip rollers 17, 18. The nip roller 17 is formed of metal, preferably aluminum, and has a metal facing, while the nip roller 18 is provided with a resilient rubber facing 19 to prevent slippage of the film. The nip roller 18 is in addition resiliently mounted and upwardly biased against the roller 17, the biasing force being provided by a spring 20.

Upon leaving the nip rollers the film passes around a second idler roller 21, thence between the perforating cylinder 12 and the anvil roller 13 to a third idler roller 22. The idler rollers 21 and 22 are preferably located adjacent one another and offset from the anvil roller as shown, so that the film is in contact with the anvil roller over a large surface area.

Upon leaving the idler roller 22 the film 15 passes between a second pair of nip rollers 27, 28, the construction and mounting of which correspond to that of the nip rollers 17, 18. Finally, the film is discharged from an idler roller 29 to a re-wind roll which is not shown. The nip rollers and perforating cylinder 12 are all driven at the same surface speed by suitable driving connections which, for clarity, have been omitted from the drawings.

As shown in the drawings, the surface of the perforating cylinder 12 is studded with perforating or venting pins 30, which are arranged in annular rows and uniformly spaced in both directions. Each of the pins 30 is firmly seated in the cylinder 12 and is provided with a long tapering portion 30a. The pins 30 are heated by thermal conduction from the perforating cylinder which has a series of heating elements 31 extending lengthwise therein. The cylinder is preferably constructed of aluminum because of its superior heat conducting characteristics so that all of the pins are maintained at substantially the same temperature. The pins, however, are made of steel so that they will maintain a sharp point and remain properly positioned in spite of long and hard use. The heating units 31 may be energized by a pair of slip rings 32, 33 which are engaged by brushes 35 projecting from a stationarily mounted brush holder 36.

In carrying out the invention the pins 30 register with annular grooves 40 which are machined in the surface of the anvil roller 13. Grooves 40 have a width which is just slightly greater than the diameter of the cooperating pins 30. Further, the grooves 40 have a depth which is sufficient to accommodate the pins even when the latter are inserted their full depth into the plastic film. The condition for full insertion, and hence maximum hole size, is shown in Fig. 3. In a commercial embodiment the pins 30 have been mounted on ⅜ inch centers. The grooves 40 have been machined to a width of .045 inch, and pins having a diameter of .020 to .030 inch were successfully used.

The anvil roller 13 is preferably constructed of aluminum or other good conducting metal mounted on a shaft 41 and is artificially cooled, preferably by the circulation of water. In the present instance water is admitted to the anvil roller 13 through an inlet 45 and transfer ring 46, the latter being non-rotatable and having communication with a passage 47 in the shaft 41. The cooling water is withdrawn from the anvil roller by similar structure at the opposite end, corresponding parts receiving corresponding reference numerals. The anvil roller 13 with its closely spaced ridges of equal radius provides an extensive, artificially cooled surface which not only supports the film 15 during perforating, but which keeps the body of the film at a low temperature thereby to localize the heating effect of the pins. In the preferred form of the invention illustrated in the drawings, the width of the ridges substantially exceeds the width of the pins.

In operation the amount of current fed to the heating elements 31 is controlled so that the pins are raised to a temperature which is sufficient to cause the thermoplastic film to plasticize or "flow" as the pins are progressively inserted. The effect of inserting one of the pins 30 is shown in Figs. 4 and 5. In Fig. 4 the pin 30 is inserted the full amount, the temperature of the pin being so adjusted as to cause an annular bead 15a to form around the periphery of the opening. None of the material is punched out so that there is no problem of disposing of punchings. Furthermore, the displaced material serves to make a smooth and symmetrical reinforcement which is found to have great dimensional stability and which preserves the strength characteristics of the film. When the temperature is raised to the proper point the pins 30 enter the film cleanly without tearing and without any tendency for the film to be stretched downwardly into the grooves. The temperature of the anvil is nevertheless kept sufficiently low so that the major portion of the film stays well below the melting point, and so that the diameter of the hole corresponds closely to the diameter of the pin 30.

While successful operation has been achieved over a wide variety of operating conditions, predominantly speed and temperature, I have found that for most of the common thermoplastic film materials a temperature of 300° F. should be used corresponding to a surface speed of 300 feet per minute. If the surface speed is increased to 400 feet per minute a higher temperature, preferably 375° F., should be employed.

It is one of the features of the present invention that the size of hole may be varied with precision over relatively wide limits. This is accomplished in the present device by providing relative movement between the anvil roller 13 and the perforating cylinder 12. In the illustrated embodiment the anvil roller is mounted for radial movement toward and away from the perforating cylinder. Mounted coaxially with respect to the anvil roller 13 is a pair of guide rollers 50, 51. These are snugly received in slots designated 52, 53, respectively. The anvil roller is positioned by means of an adjusting arm 54, which adjusting arm is pivoted at one end 55 and connected to the anvil roller by a drop link 56. In the preferred construction the lower end of the drop link 56 is guided by a guide roller 57.

At the outer end of the adjusting arm 54 is a cam 70 which bears against a cam follower 71, the cam being rotatively positioned by a calibrated hand wheel 72. It will be apparent that the level of the anvil roller and hence the depth of penetration of the pins 30 will depend upon the adjustment of the hand wheel 72 and the cam 70 coupled thereto. When rethreading a film, the cam 70 may be adjusted to the "full retract" position in which the pins are completely withdrawn clear of the surface of the anvil roller. It will be apparent that the nip rollers may be released simultaneously by separating them against the biasing force provided by the mounting springs.

Because of the precision with which the size of the holes may be adjusted, the perforating device has particular application to the making of battery separators and the like. Such separators may be used for primary batteries in which a large number of tiny holes of accurate size and spacing are required and may also be used for the manufacture of separators for secondary batteries requiring larger holes and a larger amount of electrolyte transmission area. It has also been found that tape made of thermoplastic material perforated by the present device may be employed for surgical bandages. Numerous other uses of perforated tape and thermoplastic sheet material will occur to one skilled in the art.

It has been found that the present device is particularly well suited for the manufacture of perforated bags and tubes of thermoplastic film. In accordance with the present invention a tube or bag consisting of two layers of thermoplastic film passes through the perforating machine so that the two walls are perforated simultaneously. In spite of the fact that the layers are in intimate contact, it is found that the two layers do not adhere to one another, but are each provided with a clean set of reinforced holes. The reason for the lack of adhesion of the two layers is not perfectly understood, but is nevertheless one of the advantageous features of the invention. For best results the temperature should be maintained at a minimum value consistent with the plasticizing effect illustrated in Figs. 4 and 5. When this is done the adjacent parts are not united in plastic solution and may be easily separated from one another.

I claim as my invention:

1. A perforating device for thermoplastic films comprising, in combination, a perforating cylinder having a plurality of closely spaced tapered pins arranged in annular rows and extending radially therefrom, an anvil roller for cooperating with said perforating cylinder, said anvil roller having a plurality of annular ridges defining grooves which are in register with the rows of pins on said perforating cylinder, means for guiding a film of thermoplastic material between said perforating cylinder and anvil roller, means for raising the temperature of the perforating cylinder and the pins thereon up to the point which will cause plastic flow of a thermoplastic film material which is in contact with said pins, and means for maintaining said anvil roller artificially cool, the ridges on said anvil roller being closely spaced to provide minimum clearance for said pins and presenting an extensive cylindrical surface to support the body of said film and to maintain it at a low temperature thereby to localize the heating effect of said pins.

2. A perforating device for thermoplastic films comprising, in combination, a perforating cylinder having a plurality of closely spaced tapered pins arranged in annular rows and extending radially therefrom, an anvil roller for cooperating with said perforating cylinder, said anvil roller having a plurality of annular ridges defining grooves which are in register with the rows of pins on said perforating cylinder, means for guiding a film of thermoplastic material between said perforating cylinder and anvil roller, means for raising the temperature of the perforating cylinder and the pins thereon up to the point which will cause plastic flow of a thermoplastic film material which is in contact with said pins, and means for maintaining said anvil roller artificially cool, the ridges on said anvil roller having the same radius and having a width which substantially exceeds the width of the pins to define an extensive cylindrical cooling area for maintaining the body of the film at a low temperature and for localizing the heating effect of the pins.

References Cited in the file of this patent

UNITED STATES PATENTS

| | | |
|---|---|---|
| 154,450 | Braidwood | Aug. 25, 1874 |
| 164,289 | Francis | June 8, 1875 |
| 325,673 | Guss | Sept. 8, 1885 |
| 515,927 | Stimpson | Mar. 6, 1894 |
| 838,147 | Sturgis | Dec. 11, 1906 |
| 1,313,809 | Gare | Aug. 19, 1919 |
| 1,777,791 | Fritz et al. | Oct. 7, 1930 |
| 1,958,694 | Chandler | May 15, 1934 |
| 2,004,041 | Driver | June 4, 1935 |
| 2,236,160 | Seaman | Mar. 25, 1941 |
| 2,244,550 | Chandler | June 3, 1941 |
| 2,275,603 | Boole | Mar. 10, 1942 |
| 2,275,612 | Chandler | Mar. 10, 1942 |
| 2,518,838 | Tempe | Aug. 15, 1950 |
| 2,597,511 | Mellen et al. | May 20, 1952 |